United States Patent

Neumann et al.

[11] Patent Number: 5,975,730
[45] Date of Patent: Nov. 2, 1999

[54] HEADLIGHT WITH MULTIPLE REFLECTORS FOR PRODUCING A VARIABLE LIGHT BEAM

[75] Inventors: Rainer Neumann, Stuttgart; Henning Hogrefe, Walddorfhaeslach, both of Germany

[73] Assignee: Robert Bosch GmbH, Stuttgart, Germany

[21] Appl. No.: 08/899,990

[22] Filed: Jul. 24, 1997

[30] Foreign Application Priority Data

Aug. 28, 1996 [DE] Germany ............... 196 34 754

[51] Int. Cl.$^6$ ................... B60Q 1/04
[52] U.S. Cl. ............. 362/517; 362/509; 362/538; 362/543; 362/544
[58] Field of Search ............. 362/509, 517, 362/538, 543, 544

[56] References Cited

U.S. PATENT DOCUMENTS

| | | | |
|---|---|---|---|
| 5,172,972 | 12/1992 | Terao | 362/543 |
| 5,353,204 | 10/1994 | Kawamura | 362/543 |
| 5,404,278 | 4/1995 | Shibata | 362/543 |
| 5,681,104 | 10/1997 | Chinniah | 362/543 |

FOREIGN PATENT DOCUMENTS

4313914A1  3/1994  Germany.

*Primary Examiner*—Sandra O'Shea
*Assistant Examiner*—Marshall Honeyman
*Attorney, Agent, or Firm*—Michael J. Striker

[57] ABSTRACT

The headlight apparatus has at least one headlight unit which includes several headlight subunits (20;40;60; 61;70;90). A base low beam which illuminates a base region in front of the vehicle is produced by at least one of the headlight subunits (20;40) in such a way as to fulfill the basic minimum requirements for a low beam. Additional headlight subunits (60;61;70;90) are connectable to the headlight subunit (20;40) producing the base low beam. At least one of the headlight subunits (20;70) is constructed according to the projection principle and has a reflector, a light source and, following the reflector, a lens and a diaphragm. At least one of the headlight subunits (40;60;61) is constructed according to a reflection principle and has a reflector, a light source and, if necessary, a light permeable disk with optical elements in it. A concentrated or focused light beam is produced by the headlight unit or units (20;70) constructed according to the projection principle while a horizontally scattered light beam is provided by the headlight subunit or subunits constructed according to the reflection principle.

4 Claims, 3 Drawing Sheets

HEADLIGHT WITH MULTIPLE REFLECTORS FOR PRODUCING A VARIABLE LIGHT BEAM

BACKGROUND OF THE INVENTION

The present invention relates to a headlight for a vehicle which emits a variable or changeable light beam.

The headlight apparatus according to the invention is based on the headlight apparatus described in German Patent Application DE 43 13 914 A1. This headlight apparatus has at least one headlight unit, which comprises several headlight subunits. In a first operating state of the headlight apparatus a base light beam is emitted by at least one base headlight subunit, which illuminates a base region in front of the vehicle, and in at least one further operating state at least one additional light beam is switched on which is emitted by another base headlight subunit and which illuminates a region in front of the vehicle which does'nt cover the base region. In the above-mentioned document an embodiment of this headlight apparatus is described, in which the headlight subunits are built according to the projection principle and which have a lens arranged in the path of the light reflected by the reflector and a diaphragm between the reflector and lens as needed. Headlight subunits constructed according to the projection principle are however not all equally suitable for all desired properties of the light beam considering the required structural space, so that light beams with different properties cannot be optimally produced in a minimal space with this known headlight apparatus.

SUMMARY OF THE INVENTION

It is an object of the present invention to provide a headlight apparatus for a vehicle which emits a variable light beam, which does not have the above-described disadvantages.

According to the invention the headlight apparatus for a vehicle comprises at least one headlight unit including a plurality of a headlight subunits. At least one headlight subunit is constructed according to a projection principle and comprises means for producing a concentrated light beam including a reflector, a light source and a lens arranged in the light path reflected by the reflector. At least one headlight subunit includes means for producing a base low beam which illuminates a base region in front of the vehicle. At least one other headlight subunit different from the at least one headlight subunit producing the base low beam is connectable to the at least one headlight subunit producing the base low beam and it includes means for producing another light beam illuminating another region in front of the vehicle not covering the base region in front of the vehicle. At least one headlight subunit is constructed according to the reflection principle and comprises a reflector and a light source and, if necessary, a light permeable disk arranged in the path of the reflected light from the reflector. Also at least one headlight subunit is constructed according to the reflection principle and includes means for producing a horizontally scattered light beam.

The headlight apparatus according to the invention has the advantage that both a concentrated light beam and also a horizontally scattered light beam produced by it can be optimized in regard to their light beam properties and the space required for them. The particular advantages of the headlight subunits operating according to the projection principle and also according to the reflection principle are utilized. Thus light beams with sharper light-dark boundaries and with a more limited extent are satisfactorily produced with headlight subunits operating according to the projection principle, while light beams with more scattering and larger extent, as well as light beams for high beams or illumination remote from the front of the vehicle, are better produced with headlight subunits operating according to the reflection principle.

Various embodiments of the headlight apparatus according to the invention are possible.

In a preferred embodiment of the invention the base low beam has a light-dark boundary and the at least one headlight subunit constructed according to a projection principle and comprising means for producing a concentrated light beam includes means for illuminating a front region remote from a front of the vehicle and the front region is located substantially under the light-dark boundary of the base low beam.

In a further preferred embodiment at least one headlight subunit constructed according to the reflection principle and producing the horizontally scattered light beam includes means for illuminating at least one lateral region which extends beyond the base region illuminated by the base low beam.

Advantageously at least two headlight subunits are constructed according to the reflection principle and include means for producing horizontally scattered light beams which illuminate respective lateral regions extending beyond the base region illuminated by the base low beam, and the apparatus also includes means for operating each of these at least two headlight subunits independently of each other so that they can be operated simultaneously or at different times.

In another preferred embodiment at least two headlight subunits include means for producing a base low beam, and at least one headlight subunit producing a base low beam is constructed according to the projection principle and at least one other headlight subunit producing a base low beam is constructed according to the reflection principle.

BRIEF DESCRIPTION OF THE DRAWING

The objects, features and advantages of the invention will now be illustrated in more detail with the aid of the following description of the preferred embodiments, with reference to the accompanying figures in which.

DESCRIPTION OF THE PREFERRED EMBODIMENTS

Figure 1:
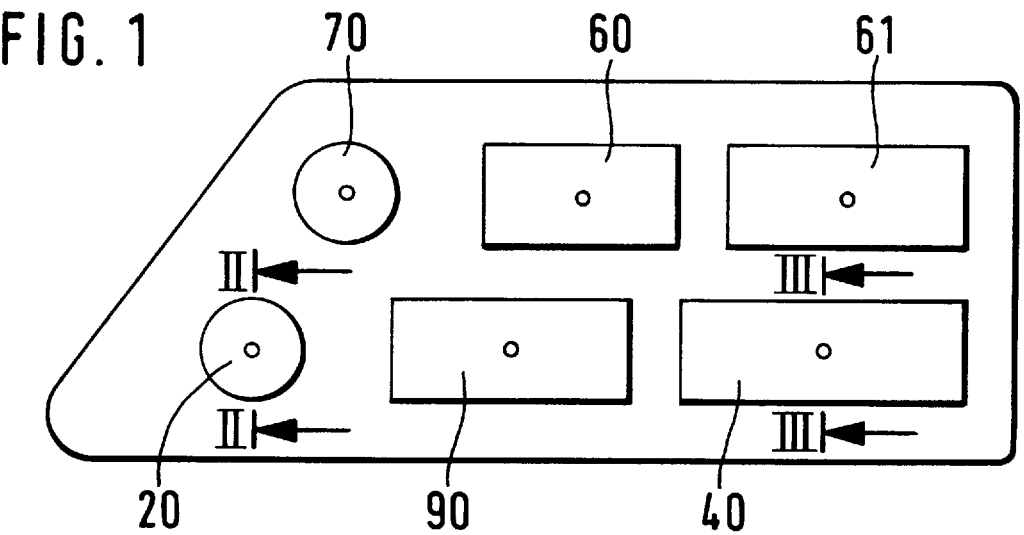
FIG. 1 is a front view of a headlight unit of a headlight apparatus according to the invention.

A headlight apparatus for emitting a variable light beam has at least one headlight unit shown in FIG. 1 which is arranged at the front end of a vehicle, especially a motor vehicle. The headlight apparatus advantageously includes at least two headlight units, at least one of which is arranged at the front end of the vehicle in a side region like the known headlight. This headlight unit has at least two headlight subunits, which are described in greater detail in the following and which can be assembled in a common housing 10. The housing 10 can have a light outlet opening, which can be covered with a light permeable cover disk 12.

Figure 2:
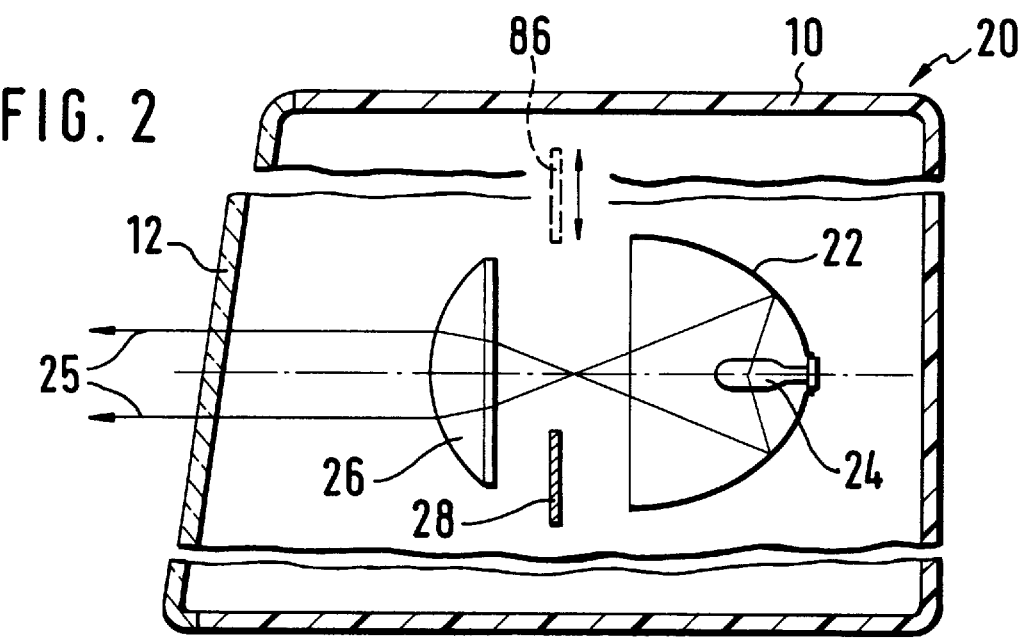
FIG. 2 is a vertical cross-sectional view of a headlight subunit from the headlight unit taken along the section line II—II in FIG. 1.

A part of the headlight subunits is constructed according to the projection principle and another part of the headlight subunits is constructed according to the reflection principle. A headlight subunit 20 constructed according to the projection principle is shown in FIG. 2. This headlight subunit 20 has a reflector 22, in which a light source 24 is mounted and by which light emitted by the light source 24 is reflected as a convergent light beam. The reflector 22 can have at least approximately an ellipsoidal form or another similar shape. An incandescent lamp or a gas discharge lamp can be used as a light source 24. A lens 26, through which the light reflected by the reflector 22 passes and is deflected, is arranged in front of the reflector 22 in the light emission direction 25. Furthermore a light impermeable diaphragm 28 can be arranged between the lens 26 and the reflector 22 which passes only a portion of the light reflected by the reflector 22 and which produces because of that a light-dark boundary of the light beam. Alternatively the shape of the reflector 22 can be designed so that it reflects light issuing from the light source 24 as a light beam which already has a light-dark boundary so that the diaphragm 28 is not required. The cover disk 12 can be smooth in the region through which light reflected by the reflector 22 and passing through the lens 26 passes or can have optical elements by which the light is deflected still further.

Figure 3:
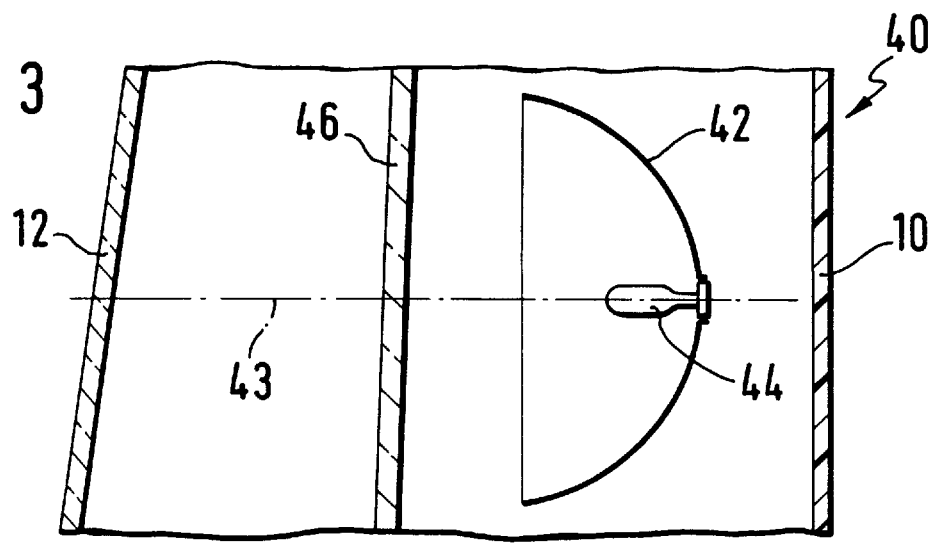
FIG. 3 is a vertical cross-sectional view of another headlight subunit from the headlight unit taken along the section line III—III in FIG. 1.

A headlight subunit 40 is illustrated in FIG. 3, which is formed according to the reflection principle. The headlight subunit 40 has a reflector 42 in which a light source 44 is mounted, which can be an incandescent bulb or a gas discharge lamp. The reflector 42 can have a predetermined form so that it reflects light emitted from the light source 44 already as a light beam, which has a required direction and scatter and passes largely unaffected through the cover disk 12. Alternatively the reflector 42 can also have a simpler form to be determined, for example at least approximately the form of a paraboloid, so that it reflects light issuing from the light source 44 as a light beam, which for example is propagated approximately parallel to the optic axis 43 of the reflector 42 and does not yet have the required direction and scatter. In this case a light permeable disk 46 can be arranged in the path of the light beam reflected by the reflector 42, which has optical elements, by which the light passing through it is deflected in the required direction. Alternatively also the cover disk 12 can have optical elements in the region through which light reflected by the reflector 42 passes, by which the light is deflected in the specified or required manner.

Figure 4:
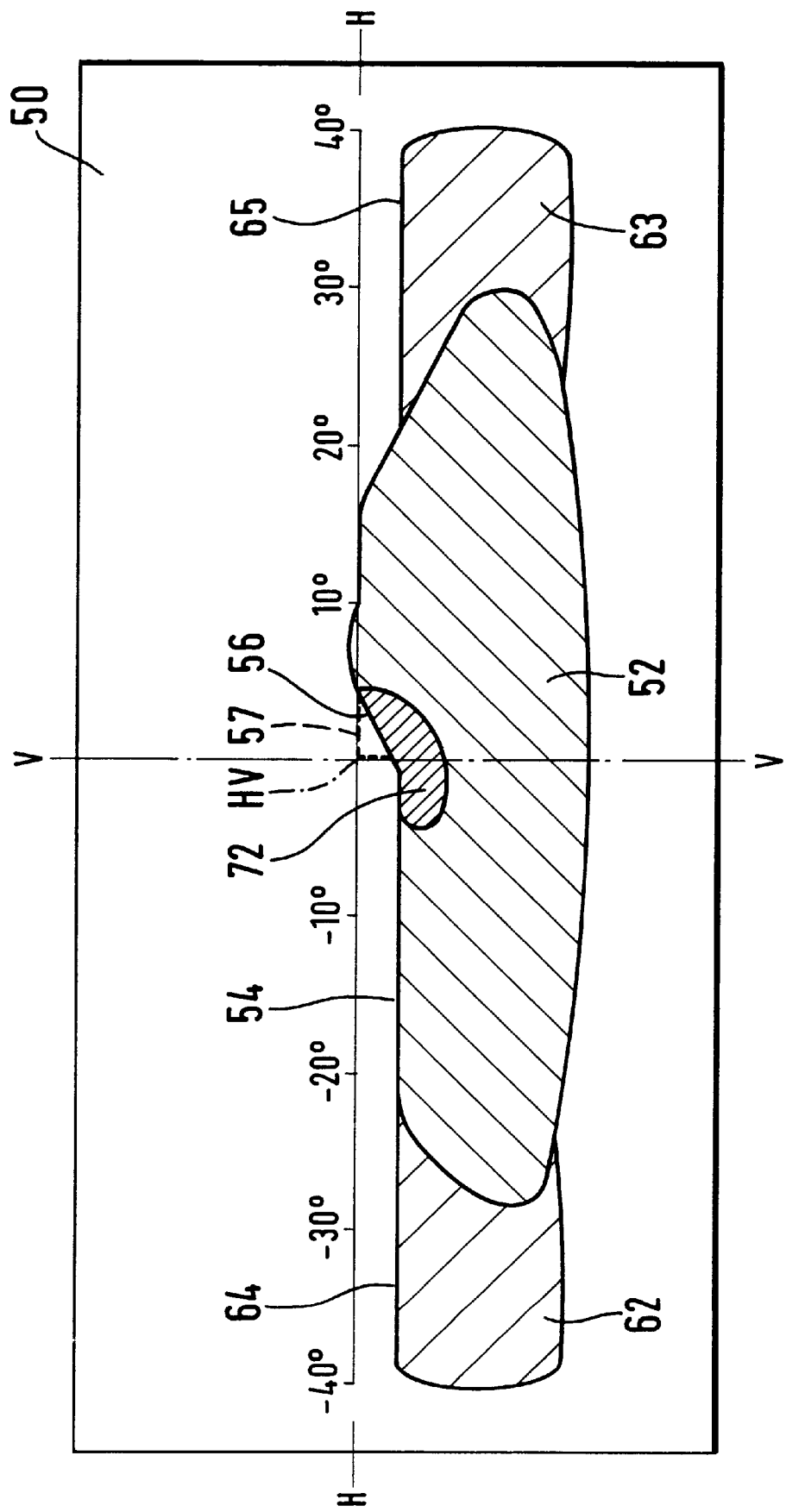
FIG. 4 is a plan view of a measuring screen arranged in front of the headlight unit with different regions illuminated in different operating states by the headlight subunits on it.

In FIG. 4 a measuring screen 50 arranged with spacing in front of the headlight unit is shown, which is illuminated by the light beam issuing from the headlight unit. The horizontal central plane of the measuring screen 50 is designated with HH and its vertical central plane is designated with VV. Both central planes HH and VV of the measuring screen 50 intersect at the point HV. In a first operating state of the headlight apparatus a base low beam is emitted by at least one base headlight subunit of the headlight unit, which illuminates the measuring screen 50 in a base region designated with the reference number 52 and produces a base intensity distribution in this region 52. The base intensity distribution fulfills the legal minimum requirements for a low beam in regard to illumination intensity at predetermined measuring points in the region 52. The base region 52 is bounded on an upper side by a light-dark boundary which has a horizontal section 54 on the on-coming traffic side, which means in the illustrated embodiment the left side of the measuring screen 50, which is arranged somewhat below the horizontal central plane HH, and which has an upwardly inclined section 56 upwardly inclined toward the edge of the measuring screen 50 and originating from the section 54 on its own traffic side, which means the right side of the measuring screen 50. Alternatively the base region 52 can also be bounded by a light-dark boundary, as it is required in legal regulations of certain lands and which has a horizontal section 54 on the on-coming traffic side and a horizontal section 57 on its own traffic side as shown in FIG. 4 with dashed lines, which is higher than the section 54. The base region 52 preferably extends over an angular range from about 20° to 35° on both sides of the vertical central plane VV. This angle is measured between a connecting line running through the point HV from the headlight unit to the measuring screen 50 and the edge of the region 52. The base low beam bundle illuminating the base region 52 can be generated by a base light beam subunit 20, which is constructed as already described according to the projection principle, or by a base headlight unit 40, which is constructed as already described according to the reflection principle.

The headlight unit can have at least one additional headlight subunit 60 in addition to the base headlight subunit 20 or 40 producing the base low beam, which is built according to the reflection principle and substantially like the already described headlight subunit 40. Two headlight subunits 60,61 are preferably provided, whereby at least one light beam is generated by them, which has a greater horizontal scatter than the base low beam issuing from the headlight unit 20 or 40. Preferably a light beam is emitted by one 60 of the two headlight subunits which illuminates the measuring screen 50 to left of the vertical central plane VV in a region 62 and a light beam is produced by the other headlight subunit 61 which illuminates the measuring screen 50 to the right of the vertical central plane VV in a region 63. The region 62 is bounded on its upper side by a horizontal light-dark boundary 64 which is arranged at least approximately at the same height as the horizontal section 54 of the light-dark boundary bounding the region 52. The region 63 is bounded on its top side similarly by a horizontal light-dark boundary 65, which is arranged somewhat below the horizontal central plane HH. It is however also conceivable that the light-dark boundary 65 deviates in the outside lateral regions from the otherwise usual light-dark boundaries or light runs over the light-dark boundary 65 in these lateral regions. The regions 62,63 on respective sides of the measuring screen 50 can extend over an angular range from about 0° to 10° to about 35° to 50°. Above all the light beam generated by the headlight subunits 60,61 provides a strong lateral illumination of the measuring screen 50, as well as the road and the scenery bordering the road on each side in front of the vehicle.

It can be provided that the headlight subunits 60,61 issuing the light beam, which illuminate the above-described regions 62,63, can be operated both individually and also simultaneously in addition to the headlight subunit 20 and/or 40 producing the base low beam. For example, it can be provided that the headlight subunit 60, which illuminates the region 62 is put into operation before or during travel around a left curve or before or during a left turn. This can occur automatically by suitable sensing and control devices, which detect the road in front of the vehicle or the leftward motion of the vehicle and then put into operation the headlight subunit 60. In the same way the other headlight subunit 61 is put into operation before or during travel around a right curve or before or during a right turn. Also both headlight subunits 60,61 can be operated simultaneously so that both regions 62,63 are illuminated which is advantageous especially with reduced travel speed of the vehicle and/or with poor visibility because of fog, rain or snow. The maximum value of the illumination intensity allowed by the legal requirements for the low beam at predetermined measuring points on the measuring screen 50 is not exceeded with simultaneous illumination of the measuring screen 50 by the base low beam of the headlight subunit 20 and/or 40 and at least one further light beam illuminating the region 62 and/or region 63.

The headlight unit can have at least one further headlight subunit 70 in addition to the headlight subunit 20 or 40 producing the base low beam and, as needed, also in addition to the previously mentioned heading subunits 60,61, which is constructed according to the projection principle and substantially like the above-described headlight subunit 20. An additional light beam with concentrated characteristics, which means reduced horizontal scattering, is propagated by the headlight subunit 70 when it operates. The light beam issuing from the headlight subunit 70 illuminates a region 72 on the measuring screen 50, which is subsequently superimposed on the region 52 below the light-dark boundary 54,56 and/or 54,57, but has a smaller horizontal extent and a smaller vertical extent downward than the region 52. The region 72 can extend on both side of the vertical central plane VV over an angular range of between about 3° and about 10°. Thus the illumination in the high beam region directly under the light-dark boundary 54,56 and/or 54,57 is amplified by the additional light beam issuing from the headlight subunit 70. The region 72 can protrude somewhat beyond the section 56 and/or 57 of the light-dark boundary on its own traffic side. The illumination of the region 72 produced by the above-mentioned headlight subunit 70 is particularly advantageous at higher vehicle speeds. The headlight subunit 70 can be automatically connected to the headlight subunit 20 and/or 40 producing the basic low beam or can be activated manually by the driver. Also the maximum values of the intensities for the low beam allowed by the legal regulations at predetermined measuring points on the measuring screen are not exceeded during simultaneous illumination of the measuring screen 50 in the regions 52 and 72.

Figure 5:
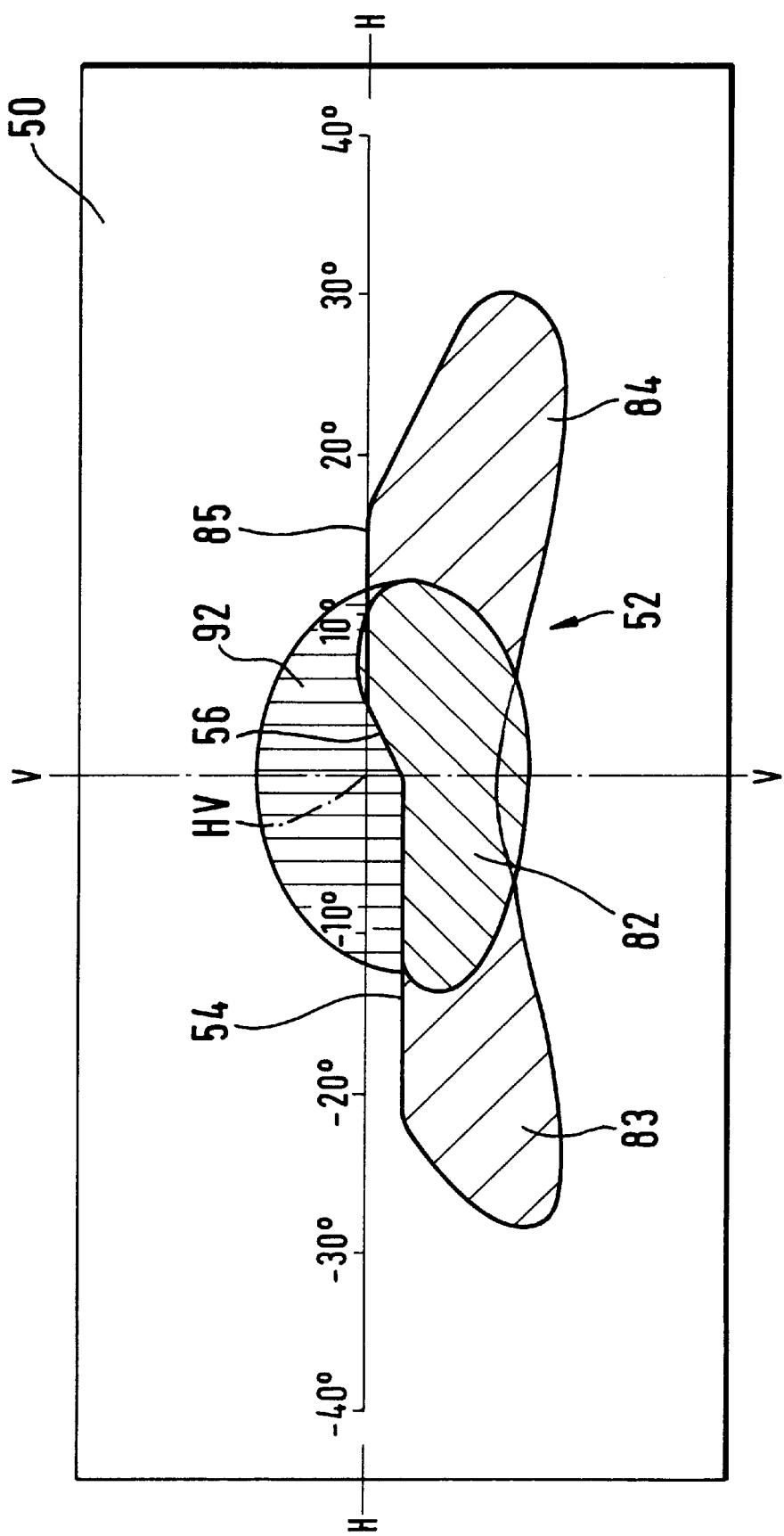
FIG. 5 is another plan view of the measuring screen of FIG. 4 with modified regions which are illuminated on it.

In FIG. 5 the measuring screen 50 is shown while it is illuminated by two basic low beams produced by different headlight subunits. The region 52 of the measuring screen 50 is illuminated by both partially overlapping basic low beams. A center zone 82 of the region 52 is illuminated by a headlight 20 constructed according to the projection principle, which is bounded on its top side by the light-dark boundary 54,56 and/or 54,57. The zone 82 extends in a horizontal direction on both sides of the vertical central plane VV over an angular range of about 10° to 15°. Zones 83,84 of the region 52 which partially overlap the zone 82 are illuminated by a headlight subunit 40 constructed according to the reflection principle. However they extend beyond the zone 82 laterally on both sides of the vertical central plane VV. The zone 83 is bounded upwardly by the extension of the horizontal section 54 of the light-dark boundary on the left side of the vertical central plane VV. The zone 84 is bounded on the top side to the right of vertical central plane VV by an extension of the upwardly inclined section 56 of the light-dark boundary or by an approximately horizontal section 85 of the light-dark boundary. The zones 83,84 extend in a horizontal direction from the vertical central plane VV over an angular range of about 20° to 35°. It can be provided that the zones 83,84 have a smaller width in the vertical direction than the zone 82 so that the front area of the road in front of the vehicle is preferably illuminated by the light beam produced by the headlight subunit 20. The headlight subunit 20 can have an additional diaphragm 86 which can be moved or swung out in a vertical direction as shown in FIG. 2 with the dashed lines, by which a part of the light beam reflected by the reflector 22, which would illuminate the front area under the light-dark boundary, can be at least partially blocked or stopped. Light from the headlight subunit 20 can reach the front area when the diaphragm 86 is in an upper position, but cannot reach the front area when the diaphragm 86 is in a lower position. An additional separate headlight subunit can also be provided for illuminating the front area, which can be connected according to choice to the headlight subunit 20,40 producing the basic low beam.

The headlight unit can moreover have an additional headlight subunit 90, which produces a high beam and which is constructed advantageously according to the reflection principle and substantially as the headlight subunit according to FIG. 3 is constructed. The measuring screen 50 is illuminated by the light beam produced by the light subunit 90 with a higher light intensity about the HV point and along the horizontal central plane HH in a concentrated region indicated with 92 in FIG. 5 substantially above the light-dark boundary 54,56. The headlight subunit 90 can alternatively also be constructed according to the projection principle for making a high beam, if the headlight unit provides sufficient space in which a sufficiently large lens can be accommodated.

The headlight unit can have an additional headlight subunit, in so far as suitable space is available. Additional fine gradations or steps of the light beam issuing from the headlight subunits in regard to lateral scattering, front field illumination, central, light concentration, etc, can be provided. At least two headlight subunits can be provided which emit a basic low beam with various light-dark boundaries. For example, a basic low beam can be produced by one headlight subunit with a light-dark boundary 54,56 according to FIG. 4, while a basic low beam can also be emitted by another headlight subunit in which the sections 54,56 of the light-dark boundary are exchanged relative to the vertical central plane VV, which means that the horizontal section 54 is arranged on the right and the rising or upwardly inclined section 56 on the left of the vertical central plane VV. By alternately actuating each of these headlight subunits the headlight apparatus can be switched for right hand traffic and for left hand traffic. Furthermore at least two headlight subunits can be provided, of which one produces a basic low beam which has the sections 54,56 of the light-dark boundaries and of which the other produces a basic low beam which has the sections 54,57 of the light-dark boundary. In this way the different legal requirements existing in different lands can be observed regarding the course of the light-dark boundary by alternate operation of the headlight subunits.

The above-described headlight subunits are advantageously adjustable relative to each other so that the light beam issuing from them is in the required direction. The entire headlight assembly or unit can be adjustable in order, for example, to be able to provide a constant illumination width independent of the loading of the vehicle. Incandescent bulbs or gas discharge lamps with reduced power requirements can be used as light sources in the individual headlight subunits, in order not to overload the electric power supply of the vehicle. Furthermore advantageously only one or two headlight subunits are operated to produce the basic low beam which results in an improvement of the visibility for the driver under existing conditions so that the power supply load can be kept low.

The disclosure in German Patent Application 196 34 754.8 of Aug. 28, 1996 is incorporated here by reference. This German Patent Application describes the invention described hereinabove and claimed in the claims appended hereininbelow and provides the basis for a claim of priority for the instant invention under 35 U.S.C. 119.

While the invention has been illustrated and described as embodied in a headlight apparatus for a vehicle for producing a variable light beam, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

We claim:

1. A headlight apparatus for a vehicle which produces a changeable light beam, said headlight apparatus comprising at least one headlight unit and said at least one headlight unit comprising a plurality of a headlight subunits (20; 40; 60; 61; 70; 90), wherein at least one (20;70) of said headlight subunits is constructed according to a projection principle and comprises means for producing a concentrated light beam including a reflector (22), a light source (24) and a lens (26) arranged in a path of light reflected by said reflector (22), wherein at least one (20;40) of said headlight subunits includes means for producing a base low beam which illuminates a base region (52) in front of the vehicle, wherein at least one other (40; 60; 61; 70; 90) of said headlight subunits different from said at least one (20;40) of said headlight subunits producing said base low beam is connectable to said at least one (20;40) of said headlight subunits producing said base low beam and said at least one other (40; 60; 61; 70; 90) of said headlight subunits includes means for producing another light beam illuminating another region (62, 63; 72; 92) in front of the vehicle not covering said base region (52) in front of the vehicle, wherein at least one (40; 60; 61; 90) of said headlight subunits is constructed according to said reflection principle and comprises a reflector (42) and a light source (44), wherein at least one (40; 60; 61) of said headlight subunits is constructed according to said reflection principle and includes means for producing a horizontally scattered light beam, wherein said base low beam has a light-dark boundary (54,56; 54,57) and said at least one of said headlight subunits constructed according to said projection principle and comprising means for producing a concentrated light beam includes means for illuminating a front region remote from a front of the vehicle and said concentrated beam illuminating said front region passes substantially under the light-dark boundary of the base low beam, and wherein said at least one of said headlight subunits constructed according to said reflection principle and producing said horizontally scattered light beam includes means for illuminating at least one lateral region extending beyond said base region illuminated by said base low beam.

2. The headlight apparatus as defined in claim 1, wherein said at least one (40; 60; 61; 90) of said headlight subunits constructed according to said reflection principle and including said reflector (42) comprises a light permeable disk (12; 46) with optical elements arranged in a light path of reflected light from said reflector (42).

3. The headlight apparatus as defined in claim 1, wherein said at least two (60,61) of said headlight subunits are constructed according to said reflection principle and include means for producing said horizontally scattered light beams which illuminate respective lateral regions (62,63) extending beyond said base region (52) illuminated by said base low beam, and further comprising means for operating each of said at least two of said headlight subunits independently of each other.

4. The headlight apparatus as defined in claim 1, wherein at least two of said headlight subunits include said means for producing said base low beam, and at least one of said headlight subunits producing said base low beam is constructed according to said projection principle and at least one other of said headlight subunits producing said base low beam is constructed according to said reflection principle.

* * * * *